Feb. 22, 1927.
F. AHLBURG
1,618,159
PROCESS OF AND APPARATUS FOR COATING ARTICLES
Filed Oct. 30, 1922
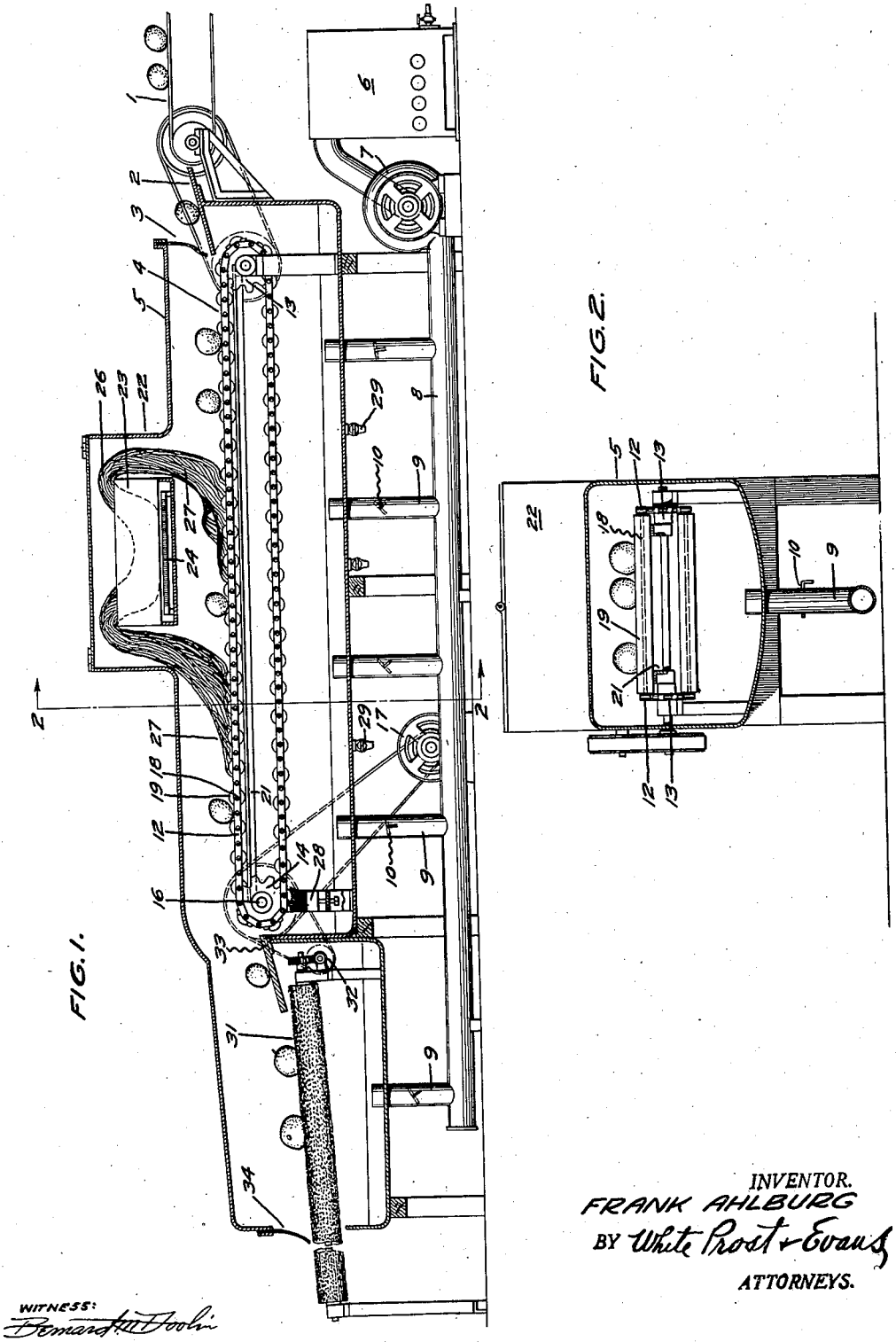
INVENTOR.
FRANK AHLBURG
BY White Prost & Evans
ATTORNEYS.
WITNESS:

Patented Feb. 22, 1927.

1,618,159

UNITED STATES PATENT OFFICE.

FRANK AHLBURG, OF LOS ANGELES, CALIFORNIA.

PROCESS OF AND APPARATUS FOR COATING ARTICLES.

Application filed October 30, 1922. Serial No. 597,706.

My invention relates to a process and apparatus for coating articles.

One of the objects of my invention is to provide an improved process of coating articles, especially fruits, with a protective material.

Another object of the invention is to provide a process of applying a film covering for fruits and vegetables that will readily coalesce with and supplement the natural wax, of their skins, and will exclude most of the air without excluding all.

Another object of the invention is the provision of an apparatus with which my process may be conveniently and easily performed.

In the drawings which show an apparatus for the expeditious and economical practice of my process, Fig. 1 is a section taken longitudinally thru the apparatus. Fig. 2 is a section taken on line 2—2 of Fig. 1.

In the preparation of various fruits and vegetables for shipment or market, means have been employed to enhance their natural beauty and aid in their preservation. The processes hitherto employed have not proven entirely satisfactory however, as an objectionable odor reminiscent of kerosene is imparted. Furthermore, the coating material is readily noticeable, and tends to become flaky and loose.

In my process, I first heat the fruit to insure a dry surface, and soften the natural wax with which my coating material is coalescent. The heating which is preferably of such character as to bring the surface temperature of the fruit to about 150° also kills blue mold and other spores to a large extent and sterilizes the surface and minor mechanical injuries to a degree that materially decreases the liability to decay. The material preferably used for coating in accordance with my process is a scale or match wax having a melting point of 95° Fahrenheit to 105° Fahrenheit, and when applied under the conditions described, this wax merges with the natural wax of the fruit to form a permanent coating which excludes most of the air. The exclusion of the air so far delays that drying out which ordinarily causes the fruit to deteriorate rapidly; that, after a period of months, fruit treated in accordance with my process is by every test of flavor and appearance as fresh as when taken from the trees. It is not desirable however entirely to exclude the air, as this would cause fermentation. Fruit treated by my process does not change color, which result usually accompanies its drying out. This preservation of the color is particularly important in the case of lemons.

My process is applicable to oranges, lemons, grape fruit, tangerines, apples, plums, pears, melons and many others, and by passing such fruit thru this inexpensive treatment the grower is enabled to lay down for top prices at distant markets months after the harvest, fruit which in every respect is equal to that freshly gathered. Not only is the appearance of the fruit improved, but losses, due to deterioration, heretofore considered a necessary evil, are prevented or minimized. It should be further noted that the scale wax I use is absolutely harmless and that the natural fragrance of the fruit treated as described herein is unaffected, the sole indication of its use lying in the enhanced beauty of the fruit and its remarkable keeping qualities.

Referring first to Fig. 1, the pieces of fruit are delivered to the receiving end of the apparatus by suitable means, such as the conveyor 1, from which they discharge upon a runway 2, rolling downwardly thru the insulating flaps or curtains 3 to a coating conveyor 4 enclosed within a housing 5. The housing is maintained at a substantial constant temperature by a current of heated air drawn thru the furnace 6, by a fan 7 and impelled thru the conduit 8 and risers 9 into the housing. Dampers 10 permit control of the currents. I heat the housing to insure a dry surface on the fruit, bring it all to the same temperature so that uniform results may be obtained, soften the natural wax coating, kill blue mold and other spores, and sterilize the surface and injured portions.

The conveyor 4 comprises spaced, parallel, continuous link chains 12 adapted to travel over sprockets 13 and 14, power being applied to the shaft 16, on which the sprockets 14 are mounted, from a suitable prime mover 17. Connecting the parallel link chains at spaced intervals are rods 18 about which are mounted conveyor rollers 19 adapted to roll upon tracks 21 disposed between the sprockets 13 and 14. From the runway 2, the fruit falls upon the conveyor rollers and is given a continuous rotary movement as it passes thru the housing.

Disposed within an extension 22 of the housing 5 above the conveyor 4, is a tank 23, in which the coating material is maintained in a fluid state at a substantially constant temperature by heat absorbed from the housing or if necessary from a supplementary unit 24 which conveniently may be electrical. As one means of applying the coating material I employ a plurality of long wicks 26 submerged midway of their length in the coating material in the tank 23. The ends 27 of the wicks hang downwardly over opposite ends of the tank and spread loosely over the conveyor 4. The ends of the wicks may be frayed out, or the wicks may be formed of material of loose texture such as is commonly used in floor mops in order to effect thorough wiping contact with the articles as they roll thru the mass of wicking on the conveyor. An adjustable wiper 28 is disposed adjacent the delivery end of the conveyor 4 in position to contact with the conveyor rollers 19 thereby preventing an excess accumulation of wax on the conveyor rollers.

It will thus be seen that I have provided a self-regulating means of supplying coating material, as the wick ends will remain saturated being continually fed with fresh material from the portions submerged in the tank.

In order to collect such material as may drip thru the rollers the bottom of the housing 5 is curved, as shown in Fig. 2, and provided with drain cocks 29. The conduit risers 9 preferably extend upwardly a few inches past the curved bottom of the housing 5, to prevent drainage of residue wax into them.

After accumulating a thorough coating of material from the wicks the fruit will be delivered from the conveyor 4 onto a plurality of parallel, cylindrical, suitably journaled brushes 31, the shafts of which are driven in the same direction by a worm 32 to which power is applied from the shaft 16, by a chain 33. The brushes are inclined, so that as they rotate, the pieces of fruit, which of course roll with them, tend to continue their movement toward the discharge end of the housing, the brushes at the same time distributing the coating film, and smoothing and polishing the surface of each piece.

The receiving ends of the brushes are disposed within the housing 5, thus providing heat to aid in the even distribution of the coating material, and insulating flaps 34 are arranged on the housing, thru which the pieces pass to the delivery end, which extends outside of the housing.

I claim:

1. The process of enhancing the keeping qualities of fruit which comprises applying thereto a surface film of scale wax.

2. The process of enhancing the keeping qualities of fruit which comprises applying thereto a surface film of scale wax having a melting point between 95° F. and 105° F.

3. An apparatus for coating articles comprising a wick immersed in the coating material, means for moving said articles in contact with said wick, and means for applying friction to said articles to distribute the adhering coating material.

4. An apparatus for coating articles comprising a wick immersed in the coating material, means for rolling said articles into and out of contact with said wick, and means for rubbing the surface of said articles to distribute thereon the adhering coating material.

5. An apparatus for coating articles comprising a wick immersed in the coating material, a roller conveyor arranged adjacent said wick and upon which said articles are conveyed into contact with said wick while rotating and means for rubbing the surface of said articles to distribute thereover the adhering coating material.

6. An apparatus for coating articles comprising a wick immersed in the coating material, means for rolling said articles into and out of contact with said wick, and cylindrical brushes for distributing the adhering coating material over the surface of said fruit.

7. An apparatus for coating fruit comprising a wick immersed in the coating material, means for moving the fruit in contact with said wick, and means for heating the fruit before its contact with said wick.

8. An apparatus for coating fruit comprising a wick immersed in the coating material, means for moving the fruit in contact with said wick, means for applying friction to said fruit to distribute the adhering coating material, and means for heating the fruit before and during contact with said wick and friction applying means.

9. An apparatus for coating fruit comprising a wick immersed in the coating material, means for moving the fruit in contact with said wick, means for applying friction to said fruit to distribute the adhering coating material, a housing enclosing the foregoing structure, and means for heating said housing.

In testimony whereof, I have hereunto set my hand.

FRANK AHLBURG.